Sept. 10, 1963 T. H. COLE 3,103,388
HIGH SPEED PNEUMATIC CONVEYOR
Filed Dec. 28, 1960

INVENTOR.
THEODORE H. COLE
BY
ATTORNEY

United States Patent Office 3,103,388
Patented Sept. 10, 1963

3,103,388
HIGH SPEED PNEUMATIC CONVEYOR
Theodore H. Cole, Union Center, N.Y., assignor to International Business Machines Corporation, New York, N.Y., a corporation of New York
Filed Dec. 28, 1960, Ser. No. 78,960
4 Claims. (Cl. 302—31)

The present invention relates to pneumatic conveyors, and more particularly to a high speed air track for conveying various sizes of electrical components from one or more supply points to a delivery station.

An object of the invention is to provide a generally improved and more satisfactory pneumatic conveyor designed to transport a wide range of sizes of cylindrical or cylinder-like objects at high speed to a delivery station with few or no changes of air pressure.

Another object is the provision of a new and improved high speed air track especially suitable for conveying various sizes of electrical components to a delivery station at one end of the track from one or more supply points distributed along the length of the track.

Yet another object of the invention is to provide a new and improved air track cross-sectional shape designed so that the air supplied to the track has sufficient lift to convey the articles without touching the sides or bottom of the track, while still having an increased component along the length of the track so that higher speeds are obtained for modest air pressures.

A further object is the provision of a new and improved air track cross-section arranged to convey electrical components ranging in size from a small diode to a large capacitor and to deliver these components to a delivery station with a relatively small circle of impact.

The foregoing and other objects, features and advantages of the invention will be apparent from the following more particular description of a preferred embodiment of the invention, as illustrated in the accompanying drawing, wherein.

Figure 1:
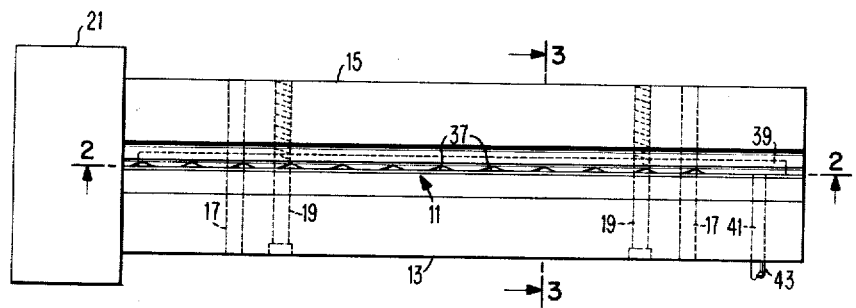
FIG. 1 is a top view of the high speed air track according to the invention.
Figure 2:
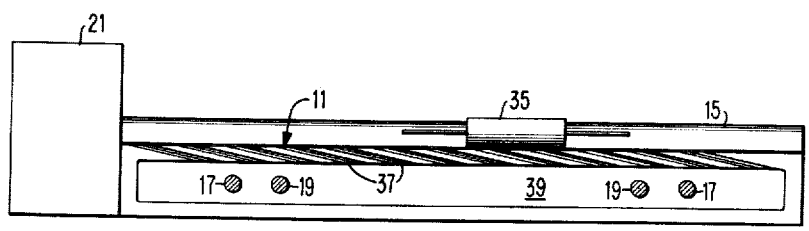
FIG. 2 is a longitudinal cross-section of the air track taken approximately on the line 2—2 of FIG. 1, and showing an intermediate-size component in the track.
Figures 3, 4, 5:
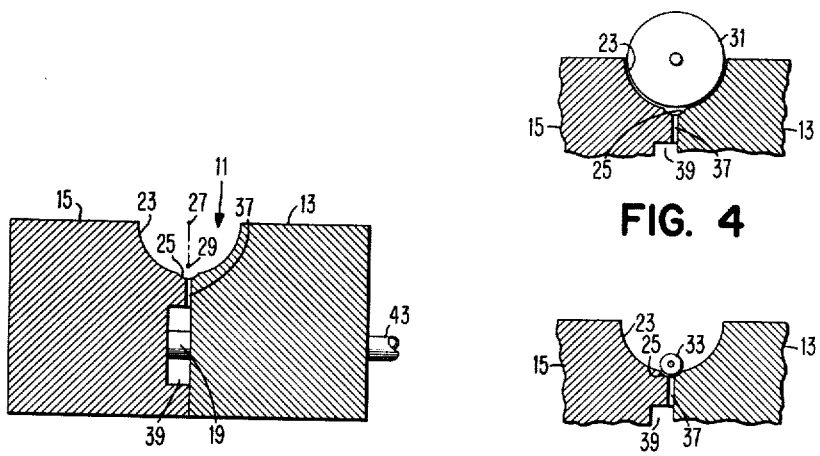
FIG. 3 is a transverse cross-section taken approximately on the line 3—3 of FIG. 1.
FIGS. 4 and 5 are fragmentary transverse cross-sectional views similar to FIG. 3 but drawn to a larger scale showing respectively the largest size component and the smallest size component which the air track will accept.

In FIGS. 1, 2, and 3 is shown an elongated pneumatic conveyor having a generally open channel 11 in its upper surface for receiving objects to be conveyed in either direction to an end of the chute. Although other pneumatic fluids than air may be used, the description will refer to an air conveyance because this fluid is commonly used and is preferred in the present invention. The channel 11 is formed in the upper surface of an elongated track member which for ease of manufacture comprises two track sections 13 and 15. A portion of the channel 11 is machined in each of the track sections 13 and 15, and then the track sections are aligned and initially held together by a pair of dowels 17. Having been assured that the two portions of the channel 11 are continuous and aligned, the track section 13 and 15 are more securely fastened together by a pair of transversely extending screws 19.

The air track according to the invention extends generally horizontally and has the primary purpose of receiving electrical components for transporting them to a delivery station 21 at one end of the track. The delivery station 21 is shown here schematically and is preferably a component insertion head such as is illustrated and described in the copending patent application of T. H. Cole and N. McDonald, Jr., Serial No. 57,436, filed September 21, 1960, now Patent 3,057,528, granted October 9, 1962. The delivery station 21 of the present application may correspond to the component insertion head 16 of the copending application, and the present air track may correspond to the pneumatic component delivery chute 17 there illustrated. Transport apparatus is also described in this prior application for delivering components at various points along the length of the pneumatically operated delivery chute. This apparatus may be used in the present invention for delivery components to the channel 11, i.e. by dropping them in from above.

The electrical components which are referred to are the familiar cylindrical coaxial leaded components such as diodes, resistors, capacitors, and the like. These components vary in diameter considerably, and the cross-sectional shape of the channel 11 is chosen such that a wide range of sizes of components may be delivered by the air stream to the delivery station 21 without substantially changing the pressure. Furthermore, it is desired that the various components impinge the delivery station 21 within a relatively small circle of impact.

With these requirements in mind, the channel 11 in transverse cross-section is in the form of a compound groove including a larger upper groove 23 and a smaller lower groove 25 which opens upwardly into the bottom of the upper groove. Since the components to be delivered are cylindrical, the upper groove 23 is semicircular while the lower groove 25 is an arc of a circle whose center lies on the same vertical line as the semicircle 23 but within its periphery. This is illustrated in FIG. 3 where point 27 is the center of the groove 23, and point 29 is the center of the groove 25, both points lying on a vertical line about which the two grooves 23 and 25 are symmetrical. It is desirable that the two grooves be symmetrical about a vertical center line joining their centers of curvature in order that components dropped into the compound groove from above are guided toward the center of the channel. This is partially to minimize the circle of impact with which they are delivered to the delivery station 21. It is for this same reason that the point 29 defining the center of curvature of the lower groove 25 lies within the periphery of the larger groove 23 rather than being on its periphery.

With a compound groove of this type, it can be seen in FIG. 4 that the largest size component 31 which the present air track can accommodate falls into the larger upper groove 23, assuming that a small clearance has been allowed between the component and the sizes of the groove. On the other hand, referring to FIG. 5, the smallest sized component 33 which the present air track can accommodate drops into the small lower groove 25 to be transported by the air stream to the delivery station 21. Components which are intermediate in size between the two limiting components 31 and 33 (such as component 35 in FIG. 2) drop into the larger groove 23 and by gravity assume a position approximately centered above the lower groove 25. In actual practice, the electrical components are buoyed up by a vertical component of the air stream and do not actually touch the sides of the grooves 23 and 25.

In order to provide a propelling air stream, a plurality of angled air passageways 37 are provided in the track member opening upwardly into the center of the bottom of the lower groove 25. For convenience of manufacture the air passageways 37 are provided by triangular slots machined in one side of the track section 13, the slots being closed by the side of the other track section 15 when the assembly of the two sections is accomplished. Of course other air passageway cross-sections work equally as well. The passageways 37 are distributed longitudinally along the track member and are inclined in the desired direction of travel of the components. Each of the air passageways 37 opens downwardly into an elongated cavity 39 in the track section 13 which is likewise closed by the side of the track section 15 when the two sections are assembled together. The cavity 39 is thus a rectangular manifold which delivers the same air pressure to each of the air passageways 37. To conduct air to the cavity or manifold 39, the track section 13 has a transverse threaded bore 41 for receiving a pipe 43 connected to a source of air under pressure.

The angular orientation of the air passageways 37 with the bottom of the lower groove 25 discharges the air at an angle in the compound groove in the desired direction of travel of the objects. The vertical components of the air jets tend to lift the electrical components so that they travel at a slight spacing above the bottom of the grooves 23 and 25. Thus there is no retardation of the electrical components due to sliding friction. The horizontal components of the air streaming from the passageways 37 propels the components in a horizontal direction towards the end of the track and the delivery station 21.

The advantages of the compound groove air track may now be realized. The lower smaller groove 25 functions to guide the minimum sized component 33 in the manner already described. In addition the smaller groove 25 distributes the air under the larger components to achieve a greater lift from the air discharged from the air passageways 37. Since this design develops more lift and consequently operates at a lower pressure in order to deliver the larger size components at relatively fast speeds, the angle of the air passageways 37 may be reduced as compared with single groove air tracks. At the same time the reduced angle produces a correspondingly increased horizontal component of the air stream which results in higher speeds along the track. For instance, the angle of the air passageways 37 with the horizontal is 12° where the radius of the large groove 23 is .200 inch and the radius of the small groove 25 is .045 inch. This compound groove is intended to convey electrical components between the range of a .090 inch minimum diameter and a .390 inch maximum diameter. For this example, the air pressure supplied to the track need not exceed 10 p.s.i.g., and the components are discharged from the track at a component velocity of 50 inches to 100 inches per second.

The advantages of a pneumatic conveyor having a compound groove or track as compared to a single groove have already been referred to, and these and other advantages will be summarized. The compound groove track is capable of conveying a larger range of sizes of electrical components without substantially changing the air pressure. Clearly, the radii of the two grooves 23 and 25 may be varied according to the particular requirements at hand. Normally the radius of the small groove 25 is chosen to correspond to the radius of the smallest component which it is desired to transport, while the radius of the larger groove 23 is made slightly larger than the diameter of the largest component which is to be transported to provide a small clearance to minimize sliding friction. Where the air passages are located at the bottom of the track at an angle to the longitudinal dimension of the track in the direction in which the components are to travel, as in the present construction, the angle of the air passageways with the horizontal may be reduced as compared to the single groove. This is because when the larger components are conveyed, air in the smaller groove 25 is distributed over a greater portion of the component and provides more lift. Consequently, the vertical component of the air jet may be reduced, with a corresponding increase in the horizontal component resulting in increased horizontal velocity for the same air pressure. Relatively modest air pressures may be used to convey even the larger diameter resistors and capacitors.

The principle of the compound grooved pneumatic conveyor applies to other transverse track cross-sections than the round track with two radii which has been described as the preferred embodiment. For instance, the larger groove 23 may be U-shaped rather than semicircular as illustrated. The two grooves 23 and 25 need not be portions of circles, but may be any suitable arcuate configuration which curves laterally and upwardly. Generally speaking the larger groove must open at its widest dimension at the surface of the track member, and the smaller groove opens at its widest dimension into the bottom of the larger groove, to allow entrance of the objects. The grooves may also be rectangular or square in cross-section. Of course, the cross-sectional shape of the grooves depends upon the cross-sectional shape of the elements or objects which are to be conveyed, and it is merely intended to indicate that the compound groove track principle is applicable to other groove shapes. In similar fashion air may be supplied to the track in other suitable manners than the structure described.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A pneumatic conveyor for objects of different sizes comprising a track member having a longitudinally extending upon channel for receiving the objects, said channel being a compound groove in transverse cross-section including a larger groove and a smaller groove each symmetrical about a center line, said smaller groove opening upwardly at its widest dimension into said larger groove, both of said grooves being arcuate to receive objects of different sizes, means defining a plurality of pneumatic passageways in said track member each opening into said smaller groove and being formed to discharge streams of pneumatic fluid directed into said smaller groove and toward the desired direction of travel of the objects in said channel, and means for supplying pneumatic fluid to said passageways to simultaneously lift the objects and convey them toward one end of said channel.

2. A pneumatic conveyor for cylinder-like objects comprising an elongated substantially horizontal track member having a longitudinally extending channel in the upper surface thereof for receiving the objects, said channel being a compound groove in transverse cross-section including a larger upper groove and a smaller lower groove each symmetrical about a center line, said smaller groove opening upwardly at its widest dimension into the bottom of said larger groove, both of said grooves being arcuate, means defining a plurality of pneumatic passageways in said track member each opening into the bottom of said smaller groove, said passageways making an acute angle from the longitudinal dimension of the channel in the desired direction of travel of the objects, and means for delivering pneumatic fluid to said passageways at substantially the same pressure, the pneumatic fluid being discharged from said passageways to simultaneously lift the objects and convey them toward one end of the track member, said compound groove being adapted to receive a variety of sizes of the objects 3. A pneumatic conveyor for a plurality of sizes of electrical components comprising an elongated substantially horizontal track member having a longitudinally extending channel in the upper surface thereof for receiving the objects, said channel being a compound groove in transverse cross-section including a larger upper groove and a smaller lower groove, each of said grooves being portions of circles having their centers on a common vertical line, said smaller groove opening upwardly into the bottom of said larger groove, means defining a plurality of pneumatic passageway slots in said track member each opening into the bottom of said smaller groove, said slots being spaced longitudinally from one another and making an acute angle with the longitudinal dimension of the channel in the desired direction of travel of the components, and means for delivering pneumatic fluid at substantially the same pressure to said passageways to simultaneously lift and convey the components along the channel to a delivery station within a predetermined circle of impact.

4. A construction as defined in claim 3 wherein the center of the circle forming said smaller groove lies substantially within the circle forming said larger groove, whereby the size of the circle of impact of the plurality of sizes of the electrical components at the delivery station is reduced.

References Cited in the file of this patent

UNITED STATES PATENTS

| | | |
|---|---|---|
| 756,600 | Dodge | Apr. 5, 1904 |
| 2,778,691 | Hazel | Jan. 22, 1957 |
| 2,805,898 | Willis | Sept. 10, 1957 |

UNITED STATES PATENT OFFICE
CERTIFICATE OF CORRECTION

Patent No. 3,103,388                      September 10, 1963

Theodore H. Cole

It is hereby certified that error appears in the above numbered patent requiring correction and that the said Letters Patent should read as corrected below.

Column 4, line 36, for "upon" read -- open --.

Signed and sealed this 14th day of April 1964.

(SEAL)
Attest:
ERNEST W. SWIDER

EDWARD J. BRENNER

Attesting Officer

Commissioner of Patents